United States Patent
Prasad et al.

(10) Patent No.: US 10,318,963 B1
(45) Date of Patent: Jun. 11, 2019

(54) SYSTEM AND METHODS FOR PERFORMING VEHICLE RENEWAL SERVICES AT AN INTEGRATED DISPENSING TERMINAL

(71) Applicant: United Services Automobile Association, San Antonio, TX (US)

(72) Inventors: Bharat Prasad, San Antonio, TX (US); Charles L. Oakes, III, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 704 days.

(21) Appl. No.: 14/687,557

(22) Filed: Apr. 15, 2015

Related U.S. Application Data

(60) Provisional application No. 61/991,780, filed on May 12, 2014.

(51) Int. Cl.
*G06Q 30/00* (2012.01)
*B67D 7/06* (2010.01)
*B67D 7/04* (2010.01)

(52) U.S. Cl.
CPC ......... *G06Q 30/018* (2013.01); *B67D 7/04* (2013.01); *B67D 7/06* (2013.01)

(58) Field of Classification Search
CPC .................................................. G06Q 30/018
See application file for complete search history.

(56) References Cited

U.S. PATENT DOCUMENTS

| | | | | |
|---|---|---|---|---|
| 4,970,655 A * | 11/1990 | Winn | ...... | G07B 15/00 235/381 |
| 6,184,846 B1 * | 2/2001 | Myers | ...... | G07F 13/025 141/351 |
| 8,754,751 B1 * | 6/2014 | Picolli | ...... | G01S 13/75 340/10.1 |
| 2003/0028285 A1 * | 2/2003 | Zura | ...... | G06Q 10/08 700/241 |
| 2003/0144905 A1 * | 7/2003 | Smith | ...... | G06Q 30/02 705/14.65 |
| 2004/0046646 A1 * | 3/2004 | Eskridge | ...... | G08G 1/017 340/425.5 |
| 2004/0153421 A1 * | 8/2004 | Robinson | ...... | G06Q 20/04 705/75 |

(Continued)

OTHER PUBLICATIONS

Smart Gas Pumps Get Stupid, by Mike, perpetualbeta.com; 2012 (Year: 2012).*

*Primary Examiner* — Dennis W Ruhl
(74) *Attorney, Agent, or Firm* — Baker & Hostetler LLP

(57) ABSTRACT

Described herein are systems and methods for determining the status and renewing a vehicle registration and/or inspection while a vehicle is located in proximity to a fuel dispensing apparatus. Data communication is established between the fuel dispensing apparatus and a vehicle located in proximity to the fuel dispensing apparatus. Data is received from the vehicle located in proximity to the fuel dispensing apparatus providing one or more identification characteristics of the vehicle. Analysis is performed using the one or more identification characteristics to determine a status of a vehicle registration and/or inspection for the vehicle located in proximity to the fuel dispensing apparatus.

18 Claims, 4 Drawing Sheets

(56) References Cited

U.S. PATENT DOCUMENTS

| | | | |
|---|---|---|---|
| 2007/0144605 A1* | 6/2007 | Horowitz | G06Q 50/30 |
| | | | 141/83 |
| 2008/0116282 A1* | 5/2008 | Sharra | G06F 17/30876 |
| | | | 235/472.01 |
| 2008/0251153 A1* | 10/2008 | Bell | B67D 7/362 |
| | | | 141/198 |
| 2011/0035049 A1* | 2/2011 | Barrett | B67D 7/346 |
| | | | 700/232 |
| 2012/0181340 A1* | 7/2012 | Hsu | B60R 13/10 |
| | | | 235/492 |

* cited by examiner

SYSTEM AND METHODS FOR PERFORMING VEHICLE RENEWAL SERVICES AT AN INTEGRATED DISPENSING TERMINAL

CROSS REFERENCE TO RELATED APPLICATIONS

This application claims priority to U.S. Patent Application Ser. No. 61/991,780 filed May 12, 2014 which is incorporated herein by reference in its entirety.

BACKGROUND OF THE INVENTION

Devices such as self-service electronic stands, self-service kiosks, and dispensers are used to provide a variety of products and services to users. Such examples include automatic teller machines (ATMs), vending machines, fuel dispensers (e.g., gasoline, car charging ports, etc.) information kiosks, etc. Each type of these devices requires various interaction time and mental focus necessary to complete a transaction or user experience.

For example, during use of a fuel dispenser (e.g., gasoline, charging station, etc.) a user is typically idle while the vehicle is refueling. Yet, during this time, the user's experience at the dispenser is relatively passive since the user does not have to focus attention on the dispenser until the fueling operation is complete. Once finished, the user typically re-engages with the dispenser (e.g., re-holsters the dispenser, collects a receipt, etc.).

In contrast, at other self-service electronic stands such as an ATM, the user's experience is short, but focused. The user begins a transaction by entering a personal identification number (PIN) and responding to a number of prompts in order to receive cash. Many users do not want to conduct any business at the ATM beyond that of receiving cash. They want a quick and efficient transaction so that they can quickly go on their way.

It can be seen that one shortcoming of fuel dispensers is that they require the customer to spend a relatively lengthy period of unproductive time while the fuel dispenses. A shortcoming of self-service kiosks and other informational kiosks is that core operations do not keep the user occupied and/or engaged long enough for institutions to provide useful information and/or to market other products and services to the user.

Accordingly, conventional fuel dispensers permit customers to dispense fuel into customer vehicles. The fueling process follows traditional steps and includes stopping a customer vehicle in near proximity to a fuel dispenser (e.g., a pump), opening a fuel port of the vehicle (e.g., a gasoline tank), selecting a fuel grade or type, dispensing fuel into the vehicle, and payment. Additional steps can be included as necessary depending on, for example, payment type, etc.

However, conventional fuel dispensers do not provide additional services or any enhanced experience to the customer. The present invention is directed to providing additional services and/or an enhanced fueling experience over existing fuel dispensing systems.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, provided is a system and method for determining the status and renewing a vehicle registration and/or inspection while a vehicle is located in proximity to a fuel dispensing apparatus. Data communication is established between the fuel dispensing apparatus and a vehicle located in proximity to the fuel dispensing apparatus. Data is received from the vehicle located in proximity to the fuel dispensing apparatus providing one or more identification characteristics of the vehicle. Analysis is performed using the one or more identification characteristics to determine a status of a vehicle registration and/or inspection for the vehicle located in proximity to the fuel dispensing apparatus.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

So that those having ordinary skill in the art, to which the present invention pertains, will more readily understand how to employ the novel system and methods of the present invention, certain illustrated embodiments thereof will be described in detail herein-below with reference to the drawings, wherein.

DETAILED DESCRIPTION OF CERTAIN EMBODIMENTS

Figure 1:
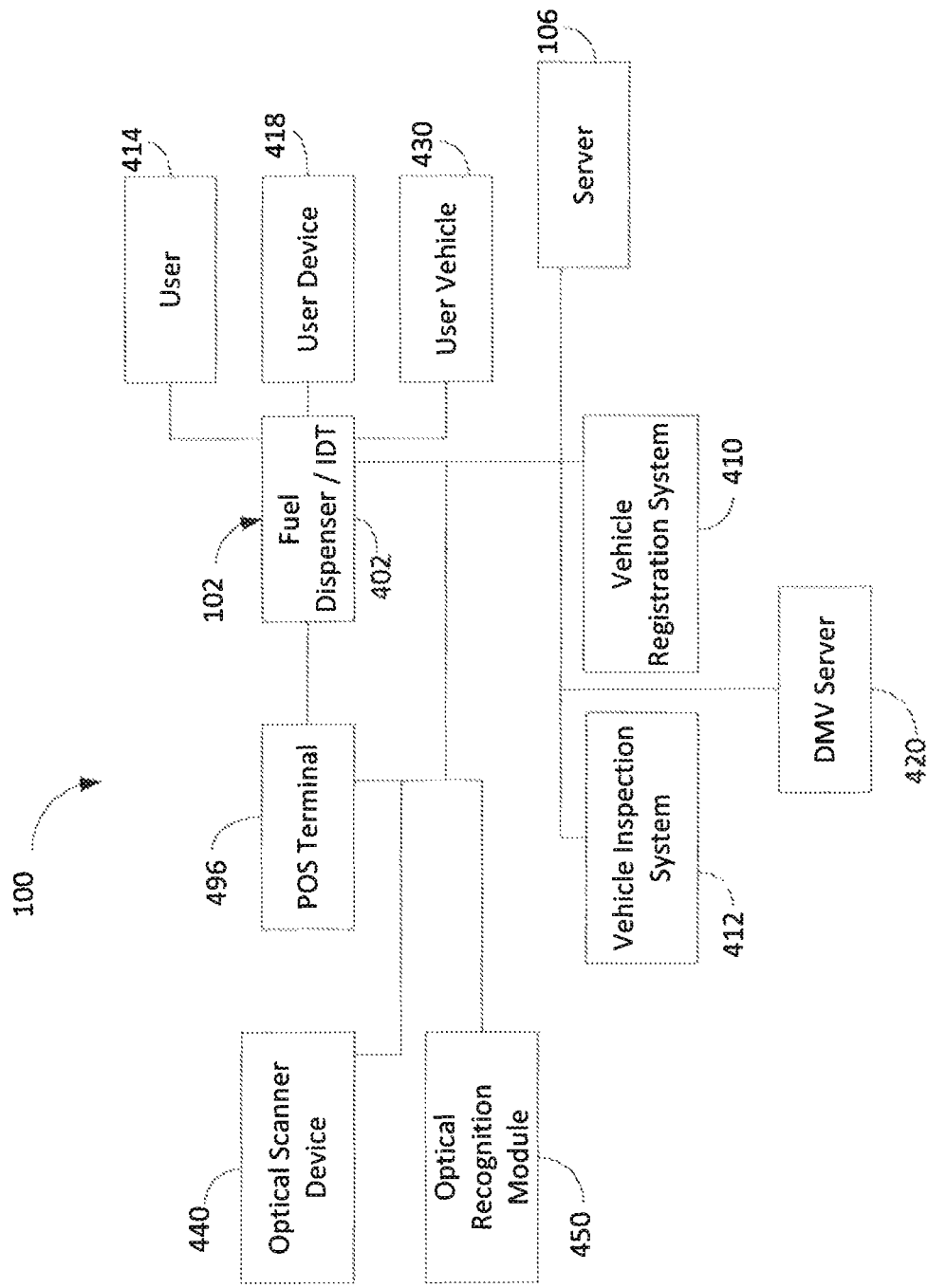
FIG. 1 depicts one embodiment of an integrated dispensing terminal system.

The present disclosure is directed to integrated fuel dispenser systems and methods for operating the same, in the below illustrated embodiments. A component or a feature that is common to more than one drawing is indicated with the same reference number in each of the drawings. It is to be appreciated the subject invention is described below more fully with reference to the accompanying drawings, in which illustrated embodiments of the present invention are shown. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated that certain embodiments of this invention as discussed below are a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. Further, the flow charts and methods described herein do not imply either required steps or a required order to the steps, and the illustrated embodiments and processes may be implemented in any order and/or combination that is practicable.

This application is related to and hereby incorporates by reference in their entirety the following: U.S. Application Ser. No. 61/750,668, filed Jan. 9, 2013 and U.S. application Ser. No. 13/920,548, filed Jun. 18, 2013.

Referring to FIG. 1, an embodiment of system 100 is shown for illustrative purposes. In one example, system comprises an Integrated Dispenser Terminal (IDT) 102 in the form of a fuel dispenser 402, a point of sale (POS) terminal 406, a vehicle registration engine 410, a license renewal engine 412, a back end system 106, and one or more users 414. It is to be appreciated, each user is preferably associated with one or more user mobile computing devices, such a smart phone device (e.g., an iPhone), a wearable computing device, a tablet device (e.g., an iPad) or any other type of portable computing device capable of connecting to a computer network, such as a Wide Area Network (WAN), Local Area Network (LAN) or the like. It is to be further appreciated vehicle registration engine 410 and/or a license renewal engine 412, may each may connected (or capable of being connected to, via a network) to a server 420 associated with one or more Departments of Motor Vehicles (DMV).

In an exemplary use of system 100, a User 414 initiates a user experience through communicating either with POS terminal 406 or IDT 102. The user 414 typically initiates communication by directly inputting data through an interface (e.g. swiping card) or by utilizing a mobile device 418 to send information to dispenser 404 or POS 406. Once the user experience commences, one or more back end systems 106 or IDT 102 interacts with vehicle registration system engine 410 and license inspection system 412 to perform user 414 vehicle renewal services as described further below.

In accordance with certain illustrated embodiments, a user's vehicle 430 operatively connects to IDT 102 when it is located in close proximity thereto such that data is exchanged between vehicle 430 and IDT 102, which data preferably includes identification information regarding the vehicle 430. It is to be appreciated any known computer networking method for coupling vehicle 430 to IDT 102 may be utilized, including, but not limited, Bluetooth, iBeacon, NFC, IR, cellular (3G), wifi, and the like.

Figure 2:
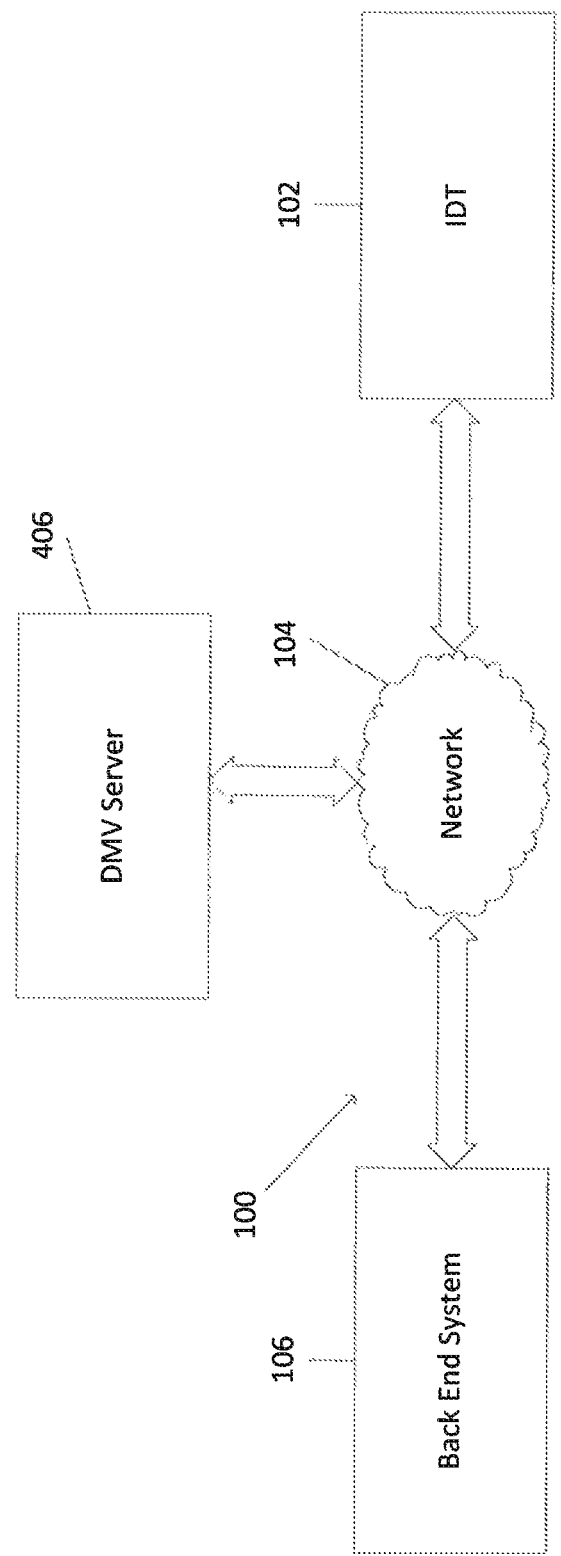
FIG. 2 depicts another embodiment of an integrated dispensing terminal system.

Referring to FIG. 2, an integrated dispenser system 100 is provided for exemplary purposes. In one example, system 100 includes at least one instance of an integrated dispenser terminal (IDT) 102, a network 104, and at least one instance of a back end system 106 and a computer server 406 associated with one or more departments of motor vehicles.

IDT 102, in one example, is the location where the user experiences described herein occur. In one example, IDT 102 is a fuel dispenser. It is contemplated herein that fuel dispensers may include gasoline dispenser, battery charger, battery replacement, and/or any energy transfer mechanism as is or will be recognized by those skilled in the art.

In another example, IDT 102 is an information kiosk. In another example, IDT 102 is an automated teller machine (ATM). It should be noted also that IDT 102 is not limited to the preceding examples and may comprise combinations of such functionality. For instance, IDT 102 may comprise a combination fuel dispenser and ATM, or a combination fuel dispenser, ATM and information (or self service) kiosk.

IDT 102 in one example communicates with back end systems 106 and server 406 through network 104. It is to be appreciated that network 104 depicted in FIG. 2 may include a local area network (LAN), a wide area network (WAN), a personal area network (PAN), and/or any combination thereof. Such networking environments are commonplace in offices, enterprise-wide computer networks, intranets, and the Internet. For instance, when used in a LAN networking environment, the system 100 is connected to the LAN through a network interface or adapter (not shown). It is contemplated herein that the network interface(s) may be wired, wireless, and/or any communication technology as would be recognized by those skilled in the art. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. It is to be appreciated that the illustrated network connections of FIG. 2 are exemplary and other means of establishing a communications link between multiple devices may be used.

System 100 may additionally include an optical scanning device 440 preferably positioned in close proximity to the IDT 102 configured and operational to detect indicia, such as a vehicle registration and/or vehicle inspection, affixed to a vehicle 430 positioned in close proximity to the IDT 102. System 100 may further include an optical recognition module 450 configured to determine and recognize information associated with the aforesaid indicia affixed to vehicle 430, such that, for instance, system 100 determines the status of a vehicle registration and inspection sticker, the functionality of which will be apparent below. Optical recognition may further include the operational ability to recognize and decipher barcodes/QR codes (and other encrypted data formats) so as to optically capture and decipher them to reveal/determine vehicle information, including (but not limited to) licensing and registrations information.

Referring now to FIG. 2, system 100 includes one or more back end systems 106 and DMV servers 406. Back end system 106 in one example includes the electronic, manual, and physical systems that support the user experience provided at IDT 102. In one example, back end system 106 comprises a point of sale (POS) terminal at a fueling station (e.g., gas station, battery charger/replacement station, and/or any entity that transfers energy to vehicles). In another example, back end system 106 comprises the servers and computers of an institution that does business or provides a user experience to users through IDT 102 (e.g. a financial institution, insurance company, a department of motor vehicles, etc.). In another example, DMV server 406 contains data related to vehicle inspection data and driver license data relative to a user 414 and a user's vehicle 430.

For instance, a financial institution could provide an ATM in IDT 102, in which case back end systems 106 would comprise the typical systems by which ATM fulfillment is achieved. Such functionality would include providing account verification, balance verification, validating biometrics and providing account information, such as balances and statements. A financial institution could also provide advertising at ATMs and/or allow the user to open bank accounts, make deposits, and perform other account maintenance. Such functionality may be supported by back end system 106.

In another example, an insurance company could utilize IDT 102 to provide a self service kiosk to users. Such a kiosk could allow users to receive insurance quotes, obtain insurance, report accidents, renew a vehicle registration and/or a driver's license, and/or check the status of insurance claims. Such functionality may be supported by back end system 106.

It should be understood that each back end system 106 comprises one or more computing devices. A computing device generally includes at least one processor, at least one interface, and at least one memory device coupled via buses. Computing devices may be capable of being coupled together, coupled to peripheral devices, and input/output devices. Computing devices may be standalone devices, but are not limited to such. Each can be coupled to other devices in a distributed processing environment.

Figure 3:
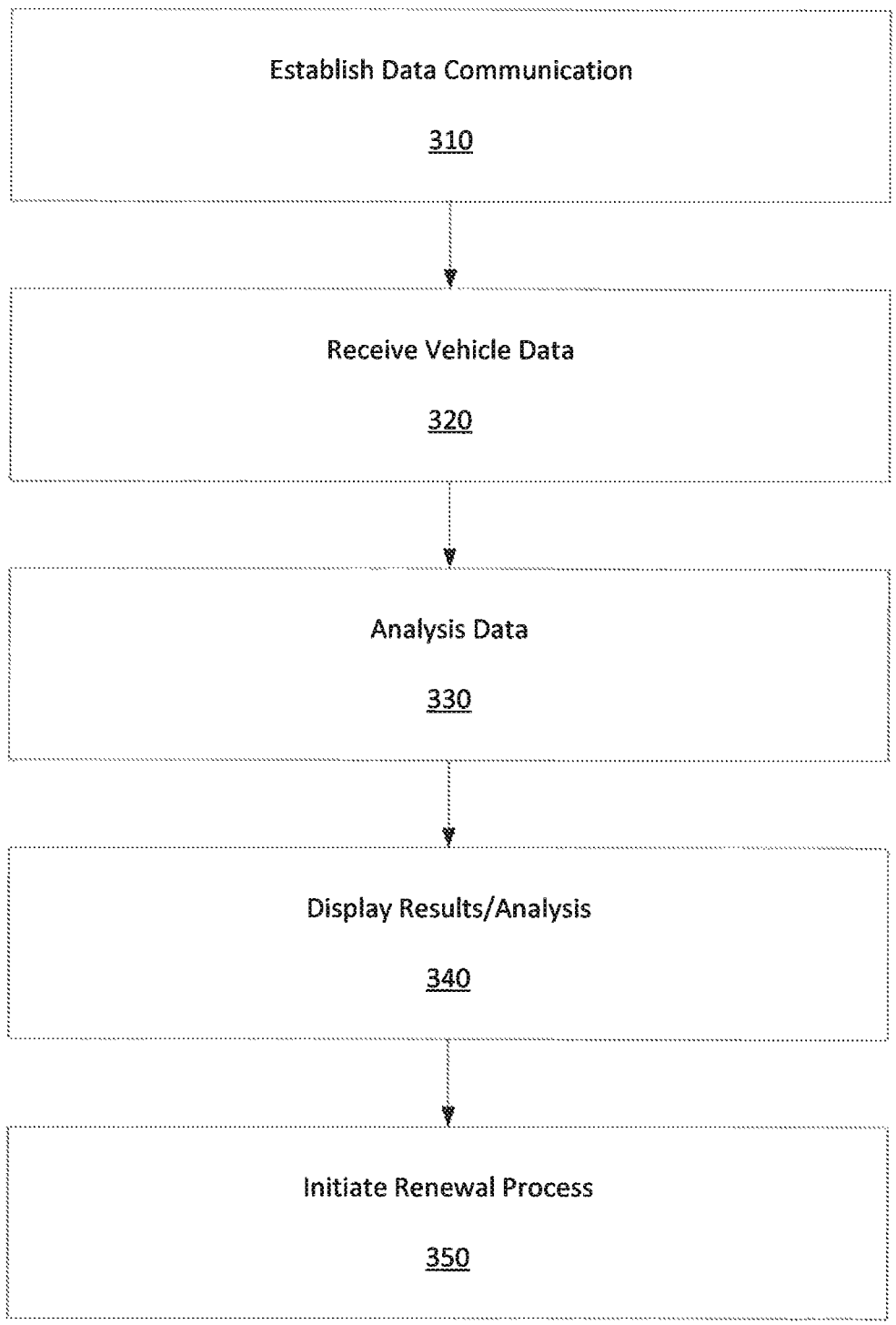
FIG. 3 is a flowchart illustrating one embodiment of a method for operating the system of FIG. 1.

Referring now to FIG. 3 an exemplary flow diagram 300 is shown for exemplary purposes and demonstrating implementation of the various exemplary embodiments. It is noted that the order of steps shown in FIG. 3 is not required, so in principle, the various steps may be performed out of the illustrated order. Also certain steps may be skipped, different steps may be added or substituted, or selected steps or groups of steps may be performed in a separate application following the embodiments described herein.

Starting at step 310, data communication is established between a user's vehicle 430 and preferably an IDT 102 (and/or POS 406), whereby the vehicle 430 is preferably positioned (e.g., parked, stopped) in close proximity to the IDT 102, as discussed above. Additionally, data communication may be established between a user's mobile computing device 418 and preferably an IDT 102 (and/or POS 406) associated with user vehicle 430.

Next, data is sent from vehicle 430 to IDT 102 whereby such data preferably includes identification of vehicle 430 (e.g., a VIN number) (step 320). Alternatively, and as discussed above, system 100 may include an optical scanning device 440 positioned in close proximity to the IDT 102 to detect vehicle registration and/or vehicle inspection, affixed to vehicle 430. An optical recognition module 450 then determines and recognizes information associated with the aforesaid vehicle registration and/or vehicle inspection indicia, so as to determine the status of a vehicle registration and inspection indicia.

Analysis is then performed on the received vehicle data to determine the registration status for vehicle 430 regarding the state (e.g., Texas) the vehicle is registered in, preferably via vehicle registration system/module 410 (step 330). It is to be appreciated, vehicle registration system/module 410 is operatively coupled to memory associated with system 100 that contains data records regarding the status of vehicle registrations for one or more states (which is preferably updated on a periodic basis). Alternatively, vehicle registration system/module 410 is operatively coupled to one or more state DMV computer servers (e.g., Texas DMV server) which contain data records regarding the status of vehicle registrations registered in a particular state (e.g., Texas).

Once the status of the vehicle registration is determined (e.g., valid, expired, expires in a certain time period (e.g., one month)), it is preferably displayed to user 414 via a display integrated with, or otherwise associated with, IDT 102 (step 340). It is to be appreciated that if a user's device 414 is operatively coupled to IDT 102 (as mentioned above), the aforesaid registration status may also be displayed on the user's device 418. It is to be appreciated that the determined status of the registration may alternatively be sent to a user via other notifications methods (e.g., email, SMS, MMS and the like) since the user may have departed the IDT 102 proximity given the short duration of a fueling transaction so as to accommodate the scenario when the registration determination takes longer than the fueling transaction.

If the user 414 desires, the user 414 may initiate renewal of the vehicle registration via interaction with IDT 102 and/or the user's device 418 (if coupled to IDT 102), such that vehicle recognition system/module 410 preferably interacts with DMV server 420 for effectuating such vehicle registration renewal (step 350). Any required payment may be performed via POS terminal 406 (which may include a payment system integrated with IDT 102). It is to be appreciated a vehicle registration, or evidence thereof (which may include a temporary vehicle registration) is generated by a printer device associated with system 100 (e.g., integrated with IDT 102). Alternatively, proof of renewed vehicle registration is sent from system 100 to a user mobile computing device 414. In accordance with another illustrated embodiment, proof of renewed vehicle registration may be sent from an IDT 102, Point Of Sale (POS) terminal or a user's device 418 to the user's vehicle 430, thereby enabling the computer system of the user's vehicle 430 to update its information.

It is to be appreciated, and as set forth in the appended claims, the above process for renewing a vehicle inspection may be performed with respect to renewing a vehicle inspection with one notably difference being the system 100 additionally receives telematics data from vehicle 430 (step 320) which is relevant to determining if vehicle 430 satisfies certain state inspection criteria in the event a user desires to initiate renewal of a vehicle inspection (step 350).

In yet another illustrative embodiment, system 100 is configured and operational to determine vehicle maintenance parameters for vehicle 430 based on measured telematics. IDT 102 preferably provides improvement advice for vehicle operation/maintenance telematics analysis. System 100 may also enable diagnostics to be performed on vehicle 430 (e.g., via onboard computer), check electrical systems, perform inspections (as appropriate) (e.g., smog testing by measuring O2 sensors, etc., check tail light operation for shorts, etc.) and provide an inspection report to user 414. System 100 may further determine total cost of ownership (TCO) and provide advice to user 414 (via ownership dashboard display screen). System 100 preferably gathers telematics data to provide the user a dashboard view of the vehicle TCO (e.g., identify the vehicle, (pairing the vehicle at the IDT 102), gather the telematics maintenance data, current service alerts, gather vehicle performance parameters (Odometer, MPG, trip information, driving patterns, etc.). System 100 may further combine telematics data with financial data such as auto loan P&I, insurance rate, generate the TCO dashboard that provides the user with a deeper insight into vehicle, financial health, maintenance urgency, offers, purchase recommendations, safety recommendations by detecting crashes, hard accel/braking, etc.).

Figure 4:
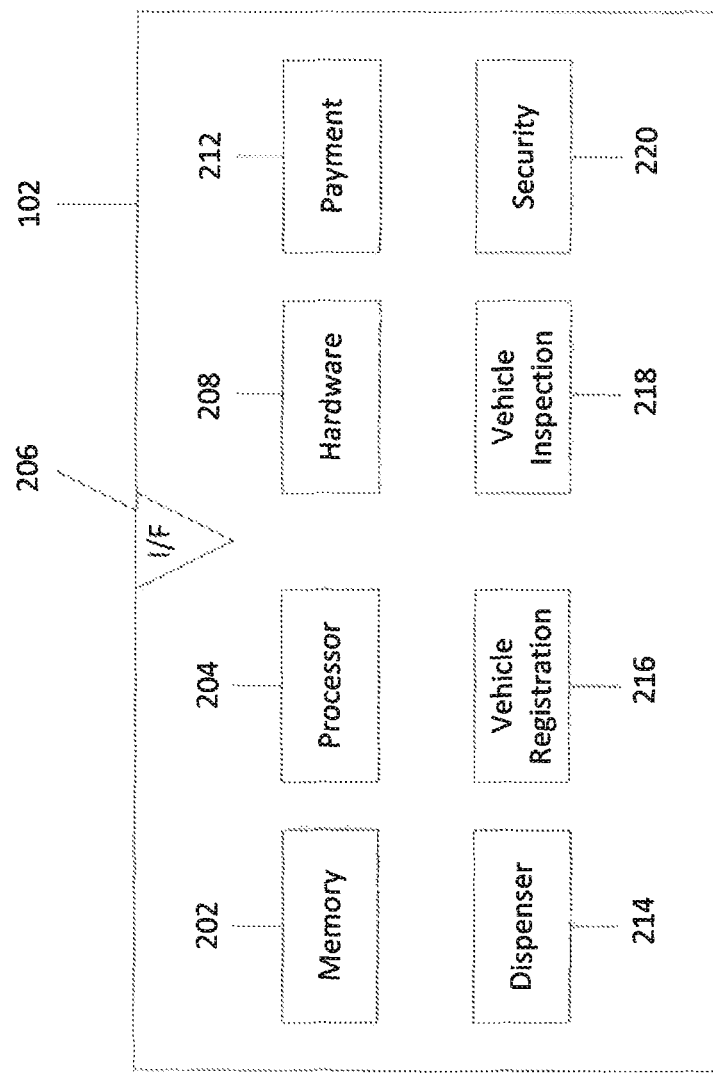
FIG. 4 is a functional block diagram of an exemplary integrated dispensing terminal in FIG. 1.

Referring to FIG. 4, a system diagram of IDT 102 is now provided for illustrative purposes. In one example, IDT 102 includes at least one memory 202, at least one processor 204, at least one data interface 206, and IDT hardware 208.

Memory 202 is a computer-readable medium encoded with a computer program. Memory 202 stores data and instructions that are readable and executable by processor 204 for controlling the operation of processor 204. Memory 202 may be implemented in a random access memory (RAM), volatile or non-volatile memory, solid state storage devices, magnetic devices, a hard drive, a read only memory (ROM), or a combination thereof.

Processor 204 is an electronic device configured of logic circuitry that responds to and executes instructions. The processor 204 may comprise more than one distinct processing device, for example to handle different functions within IDT 202. Processor 204 outputs results of execution of the methods described herein. Alternatively, processor 204 could direct the output to a remote device (not shown) via network 104.

Data interface 206 may include the mechanical, electrical, and signaling circuitry for communicating data over network 104. Interface 206 may be configured to transmit and/or receive data using a variety of different communication protocols and various network connections, e.g., wireless and wired/physical connections, Bluetooth®, iBeacon. However, it should be noted that the view used herein is merely for illustration. Interface 206 can further include an input device, such as a card reader, RFID reader, QR code reader, keyboard, video capabilities, a touch screen or a speech recognition subsystem, which enables a user (e.g., a candidate) to communicate information and command selections to processor 204. Interface 206 can also includes an output device such as a display screen, a speaker, QR code generator, a printer, etc. Interface 206 can further include an input device such as a touch screen, a mouse, track-ball, or joy stick, which allows the user to manipulate the display for communicating additional information and command selections to processor 104. Through utilization of interface 106, IDTs 102 are capable of being coupled together, coupled to peripheral devices, and/or input/output devices. IDT 102 is represented in the drawings as a standalone device, but is not limited to such. Each IDT 102 may be coupled to other IDTs 102 in a distributed processing environment, such as over one or more LANs and/or WANs (e.g., the Internet).

IDT hardware 208 comprises the physical hardware necessary to produce a core user experience at IDT 102. For instance, if IDT 102 were to include gasoline dispenser functionality, IDT hardware 208 would include the physical pump hardware to pump gas into an automobile (pump, dispenser, cradle, etc.). If IDT 102 were to include battery charging functionality, IDT hardware would include the physical hardware necessary to transfer electricity to a battery in the vehicle. If IDT 102 were to include ATM functionality, then IDT hardware 208 would include the physical ATM hardware needed to dispense and/or deposit cash and/or financial instruments (e.g., checks) at IDT 102, and such deposits may be physically relocated (e.g., vacuum tubes to a nearby building). If IDT 102 were to include informational or self-service kiosk functionality, then IDT hardware 208 would include the physical hardware needed to conduct business or provide information at IDT 102 (e.g. printing devices, audiovisual devices, coupon dispensers, product dispensers).

Referring further to FIG. 4, IDT 102 includes a number of engines to provide the functionality making up the user experiences at IDT 102. The term "engine" is used herein to denote a functional operation that may be embodied either as a stand-alone component or as an integrated configuration of a plurality of subordinate components. An engine may be implemented as a single module or as a plurality of modules that operate in cooperation with one another. An engine may be implemented as software stored in memory 204 and executing on processor 206 or in a distributed computing environment an engine could be located and executed across multiple locations. Further, an engine may also be implemented in any of hardware (e.g., electronic circuitry), firmware, software, or a combination thereof.

For exemplary purposes, IDT 102 includes payment engine 212, dispenser engine 214, vehicle registration engine 216, vehicle inspection 218, and security engine 220.

Payment engine 212 provides the functionality through which a user can pay for a product at IDT 102. In one example, payment engine 212 includes functionality to allow a user to pay through utilization of any combination of a credit card, debit card, loyalty card, gift card, promotional card, etc. In another example, payment engine 212 includes functionality to allow a user to pay through utilization of an application (e.g. thin client), operating on a client mobile device (e.g., smart phone, tablet, Google Glass®, smart watches, or any mobile computing device as would be recognized by those skilled in the art), and communicating with IDT 102 through interface 206. In another example, payment engine 212 includes functionality for a user to pay (either before, after, or while the user is at IDT 102) through an application operating on a computer or mobile device and communicating with back end system 106. Payment engine 212 could then engage with back end system 106 to complete the transaction. For instance, payment engine 212 could ask back end system for approval to allow the user to "pay later" after the user has left IDT 102. Also, payment engine 212 could verify with back end system 106 that the user has paid, or that the user's account is up to date, prior to engaging in a dispensing operation.

Dispenser engine 214 provides the functionality for IDT 102 to dispense products to users on site (e.g., gasoline, electricity, cash, vehicle registration/inspection evidence/indicia). In one example, dispenser engine 214 includes fuel dispenser functionality. Such functionality may include, but is not limited to, tabulating the amount of fuel dispensed, safety mechanisms (e.g. automatic shut off), and sensing whether the pump handle is in its cradle. For instance, removal of the pump handle could serve as a prompt to begin a user experience, such as providing advertising, banking, or other self service activity. Insertion of the dispensing handle in a cradle could serve as a prompt to conclude a user experience or transfer the user experience session to another device. Another safety sensor could be comparing the speed with which the fuel is being dispensed to the speed with which the vehicle is being refilled (e.g., if 1.2 gallons per second are being discharged, but only 1.1 gallons per second are being placed in the vehicle's fuel tank, such may indicate the dangerous condition that some is being spilled so the fuel dispensing should stop). Further, it is contemplated herein that a disparity between the fuel discharge rate and the refueling rate may indicate that the fueling station is corrupt and/or malfunctioning.

In another example, dispenser engine 214 may include ATM functionality to provide cash, account balances, accept deposits, print statements, etc. at IDT 102. Dispenser engine 214 may also include virtual dispenser functionality. For instance, IDT 102 could distribute intangible items of value to user. Such intangible items may include rebates, reward points, virtual coupons, and the like. In one example, these intangible items can be provided directly from IDT 102 to user mobile devices, or alternatively these could be added to user accounts maintained by back end systems 106.

Vehicle registration engine 216 controls the aforesaid process for renewing a vehicle registration while vehicle inspection engine 218 controls the aforesaid process for renewing a vehicle inspection, as both described above.

Security engine 220 interacts with any sensors and/or other engines to detect possible security breaches, some of which have been identified herein for exemplary purposes. If such a security breach has been detected, security engine 200 sends a message (e.g., to the police), disables the vehicle, and/or any of the methods and/or actions described herein.

In other exemplary embodiments, this disclosure contemplates communication and interaction amongst a user (e.g., a consumer), a vehicle and an integrated fuel dispensing terminal (IDT). Notably, this disclosure particularly appreciates that various types of fuel dispensing terminals can be used such as, but not limited to: gasoline pumps, electric charging stations, fuel cell dispensers, battery pack changing stations, hydrogen pumps, alternative fuel pumps, etc.

With respect to communication amongst the user, vehicle, and IDT, the invention contemplates communication amongst the vehicle and the IDT to exchange data such as the make, model, etc. The IDT, in turn, can monitor the current status or health of the vehicle (brakes, battery status, steering, security, fuel, lights, tire wear, external condition of the car, oil condition, electrical condition (e.g., amount of charge), etc.) and notify the user of the status via, for example, a display, or sending one or more messages to a client device (e.g. a mobile phone) of the user that the vehicle may need repairs and/or a service check. If the station is equipped with proper staff and equipment, the IDT may notify the user that repairs can be made on-site. Additionally, marketing materials such as coupons or promotions linked to the potential repairs can be delivered via the IDT to the user. The IDT can also determine that based on the model, make, etc., the user has selected an incorrect fuel source (e.g., attempt to fill the vehicle with diesel fuel), and stop or halt dispensing and notify the user. The IDT may also determine if the user selected an unusual fuel quality (e.g., medium octane as opposed to high octane) and optionally notify the user with a message such as, for exemplary purposes only and without limitation, "that selection will result in 3 fewer miles per gallon." The IDT can also determine if a good or service (e.g., car washing, fuel) is contrary to that user's previous selections and/or financial situation and optionally (per system's options and/or the user's option) notify the user, including pausing finalizing that selection until after the user confirms the selection. In some embodiments, the user may register an account (e.g., an email address) to receive electronic notifications from the IDT in a specified fashion or alternatively, the user can download a dedicated application to a respective client device. The IDT, in response to the current status of the vehicle, can provide (e.g., display, transmit, etc.) marketing or advertising promotions to the user relating to, for example, vehicle maintenance (e.g., coupons for vehicle fluids, brake pads, alignment, tires, etc.). In further embodiments, the IDT can determine a mileage status, a trade in value, a total cost to own from a current state (e.g., the IDT receives such information from the vehicle, stored information related to the vehicle, and/or past usage of the vehicle). The IDT can provide recommendations to the user for trade in value(s) of the vehicle and may even communicate or recommend replacement vehicles from local or remote vehicle dealers. Such information may be provided, for exemplary purposes only, if the user has had the vehicle for their usual length of ownership time (e.g., three year lease), if the vehicle has been used a certain amount (e.g., if a car has 250,000 miles), and/or if repairs are anticipated for the current vehicle so replacing it sooner rather than later may be financially sound.

In additional embodiments, the IDT can communicate with other commercial outlets that provide related products and/or services (e.g., the gas station having convenience store capability), determine inventory of certain goods, and provide incentives (e.g., coupons, promotions, etc.) to the user to purchase such certain goods. In this fashion, the fueling station can implement more effective inventory management techniques when, for example, certain goods are in surplus.

In some embodiments, the IDT can communicate with the vehicle to determine recent travels (e.g., locals, destinations, origination, etc.) and further determine local or on route destinations (e.g., family, friends, business associates, route points of interest, next fuel suggestions, speed traps, other "gotchas" etc.). Such local or route destinations can further relate to a vehicle status, or a selected preference from the user and provide local auto maintenance destinations, wash, lube, tires, brakes, service stations, engage towing service or road side assist, etc.

In other embodiments, the IDT can provide services such as creating reservations or appointments for hotels, events, restaurants, movies, haircut, dentist, doctor, etc. The IDT can also communicate with the vehicle, determine a distance to the destination, and send an estimated time for arrival (ETA) to other devices (e.g., family, friends, business associates, etc.). The IDT can further notify the user regarding local changes in the law (e.g., speed limit changes, road closures, lights, signage, etc.). In addition, the IDT can provide updates or alerts for traffic and traffic patterns (e.g., rush hour, accident, road closure), local events (e.g., sporting events), weather conditions. Such alerts can also include evacuation routes, food sources, water sources, medical sources, etc. The IDT may provide an interactive map services to display locations of such alerts and traffic patterns or push these alerts/traffic patterns to the user's mobile device. In some embodiments, the IDT can also suggest routes according to these traffic patterns (e.g., a sporting game ends at a particular time and traffic is heavy on a particular path, or there inclement weather is in-climate and certain roads should be avoided, etc.). The IDT can also provide alerts for local or national events (e.g., voting days), anniversaries, holidays, etc.

The IDT can also determine and communicate information regarding security with respect to the crime rate of the immediate area (e.g., the fuel dispenser, the intersection, side streets, etc.). In these embodiments, the IDT may communicate with local or remote surveillance equipment, or simply may receive security updates (e.g., via a WAN or LAN discussed above). Additionally, in some embodiments, the IDT can authenticate the user and the vehicle. For example, the user may be required to provide a QR code for an account that can include vehicle information as well as user information. If the user provides an incorrect QR code, the IDT can send an alert, prevent fueling, and/or notify the registered user of the vehicle. Alternatively, the IDT may require biometrics (e.g., finger prints (including images and/or physical sensors), voice, facial recognition, DNA, body recognition, eye scanning, and/or any biometrics as would be recognized by those skilled in the art) for authentication/security, determine electronic images of the driver and/or passengers. The biometrics may be measured such as, for exemplary purposes only and without limitation, high resolution cameras that capture images of the person, physical sensors on places the user may touch (e.g., the fuel dispensing handle, the client mobile device). In some embodiments, such information can be compared against a missing persons database, an escaped criminal database, etc.

Moreover, the IDT can determine there are too many people in the car, determine validity of the license sticker, determine the license plate and/or VIN (if such exists), inspection sticker, license plate number, external condition of the car (accident), etc. The IDT may also determine if the refueling transaction is unusual. For example, if a user had withdrawn 50 gallons of gas to allegedly refill a Prius® (e.g., the user was filling another vehicle and/or container) and/or if the user withdrew more gas than there was free space in the vehicle's gas tank, and the IDT may only authorize a purchase amount sufficient to refill the identified vehicle. The IDT, in response to these determinations, may notify local police and/or disable the vehicle (e.g., sending a command to the vehicle to cease functioning, sending a command to the vehicle to continue to operate environmental controls but cease operation of mobility controls). The determinations may be based on a comparison between biometrics and the vehicle (e.g., different driver than previously identified). The IDT can further employ delay techniques (e.g., slow down gas flow), to provide police time for approach.

In some embodiments, the user, via a client mobile device, can communicate with remote IDT(s) and pre-purchase fuel for the car (e.g., grade of fuel, quantity, an amount of electricity, reserve a new battery (if switching batteries), etc.). Further, the IDT may notify the user which fuel options are available (e.g., grade of fuel), and optionally suggest an alternative refueling establishment, for example if the user's typical selection is not available. The user can also pre-order items such as food, car parts, fluids, etc., from a retail outlet, such as one nearby the IDT. Further, each IDT may be equipped to determine respective availability and notify a user that each IDT at a particular fueling station is busy and recommend a next closest station. Further, the IDT or Back End System (discussed above) can determine an amount of fuel the user purchases throughout the year and provide an incentive program (e.g., frequent fuel miles programs) to entice the user to continue to purchase fuel from the particular IDT system.

The IDT can also support various payment methods. For example, the user (via a client mobile device) can provide electronic wallet information to the IDT. In this fashion, a user can even specify multiple payment methods for the same total transaction (e.g., a certain dollar amount for per each payment method). Alternatively, the IDT can accommodate payment by a third party (e.g., the IDT can communicate with the third party for payment).

The IDT may also be equipped with biometric recognition and include security techniques that prevent other persons from using the account. The speech and voice recognition may be coupled to additional devices (e.g., video, breathalyzers, etc.) to determine a health indicator of the user (e.g., sleepy, sober, emotional state, etc.) and alert the user and/or additional it is unsafe for the user to drive.

Additionally, the IDT can commoditize data collected and provide data to help an insurance company or bank to underwrite risk; data to help auto manufacturers understand consumer behavior; data to help identify new fuel dispensing station locales; data to help retail outlets stock shelves; data to help locals advertise to travelers; data to help transportation safety; data to help road maintenance scheduling; data to help with traffic flow analysis and design.

In each of the above discussed embodiments, it is to be understood that the IDT can include local or remote processing for employing the described techniques. That is, the IDT can include local or remote processing circuitry to store, determine, and transmit data to/from the user, the vehicle, etc. Additionally, the embodiments discussed above can include functionality discussed in U.S. Provisional Patent Application No. 61/661,027 filed on Jun. 18, 2012 and U.S. patent application Ser. No. 12/500,742, filed on Jul. 10, 2009, the contents of which are herein incorporated by reference.

In one or more embodiments, each user may be associated with membership data that includes, for exemplary purposes only and without limitation, the length of time the user has been a member, the adherence of the user to a third party's products/services, and recent changes to the user's life, family, and/or financial situation. Based on this information, targeted messages, such as product advertisements, may be sent to the user, such as during the user's interaction with the fuel dispenser.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention as defined by the appended claims.

What is claimed is:

1. A fuel dispensing apparatus, comprising:
  a fuel pump including a communication interface configured to communicate with a vehicle based on the vehicle being located in proximity to the fuel dispensing apparatus; and
  a computer for processing data collocated with the fuel pump, the computer comprising a memory configured to store instructions and a processor disposed in communication with the memory, wherein the processor upon execution of the instructions is configured to:
    establish data communication between the fuel dispensing apparatus and the vehicle based on the vehicle being located in proximity to the fuel dispensing apparatus;
    receiving data from the vehicle located in proximity to the fuel dispensing apparatus providing one or more identification characteristics of the vehicle;
    perform analysis on the one or more identification characteristics to determine an identity of the vehicle including a state of vehicle registration;
    determining a state department of motor vehicles possessing data records reflecting statuses of registrations in the state of vehicle registration;
    communicate with a department of motor vehicles server associated with the state department of motor vehicles to determine an expired status of a vehicle registration for the vehicle located in proximity to the fuel dispensing apparatus based on the identity, wherein the computer is operatively coupled to department of motor vehicles servers for the state and at least one other state;
    process payment for renewal of the vehicle registration at the fuel dispensing apparatus; and
    cause updating of records in the department of motor vehicles server associated with the state to reflect the renewal of the vehicle registration.

2. The fuel dispensing apparatus as recited in claim 1, wherein the instructions are configured to further cause the processor to establish data communication between the fuel dispensing apparatus and a mobile computing device associated with the vehicle located in proximity to the fuel dispensing apparatus.

3. The fuel dispensing apparatus as recited in claim 2, wherein the expired status of the vehicle registration is provided on a display integrated with the mobile computing device.

4. The fuel dispensing apparatus as recited in claim 2, wherein the instructions are configured to further cause the processor to:
  on removal of a pump handle from a cradle associated with the fuel pump, begin an interaction; and
  on return of the pump handle to the cradle associated with the fuel pump, transfer the interaction to the mobile computing device.

5. The fuel dispensing apparatus as recited in claim 1, wherein the fuel dispensing apparatus is in communication with memory containing vehicle registration information for a plurality of vehicles.

6. The fuel dispensing apparatus as recited in claim 1, wherein the instructions are configured to further cause the processor to generate a vehicle registration from a printer device associated with the fuel dispensing apparatus.

7. The fuel dispensing apparatus as recited in claim 1, wherein the instructions are configured to further cause the processor to send proof of renewed vehicle registration to a mobile computing device associated with the vehicle located in proximity to the fuel dispensing apparatus.

8. The fuel dispensing apparatus as recited in claim 1, further comprising:
  an optical scanning device of the fuel pump configured to collect optical information related to a vehicle; and
  an optical recognition module configured to determine and recognize at least one of the one or more identification characteristics of the vehicle based on the optical information.

9. The fuel dispensing apparatus as recited in claim 8, wherein the optical information includes an image of one or both of a vehicle registration and a vehicle inspection certificate affixed to the vehicle.

10. The fuel dispensing apparatus as recited in claim 1, wherein the processor upon execution of the instructions is further configured to:
  process payment for a fuel purchase at the fuel dispensing apparatus, wherein payment for the fuel purchase is processed concurrently with payment for renewal of the vehicle registration.

11. The fuel dispensing apparatus as recited in claim 1, further comprising:
  a biometric recognition module to authenticate a user of the fuel dispensing apparatus, wherein the user is authenticated biometrically before the payment is processed.

12. A computer system for processing data at a fuel dispensing apparatus, comprising:
  a memory configured to store instructions; and
  a processor disposed in communication with the memory, wherein the processor upon execution of the instructions is configured to:
    establish data communication between the fuel dispensing apparatus and a vehicle based on the vehicle being located in proximity to the fuel dispensing apparatus;
    receiving data from the vehicle located in proximity to the fuel dispensing apparatus providing one or more identification characteristics of the vehicle;
    perform analysis on the one or more identification characteristics to determine an identity of the vehicle including a state of vehicle registration;
    determine a state department of motor vehicles possessing data records reflecting statuses of inspections in the state of vehicle registration;
    communicate with a department of motor vehicles server associated with the state department of motor vehicles to determine an expired status of a vehicle inspection certificate for the vehicle located in proximity to the fuel dispensing apparatus, wherein the computer system is operatively coupled to department of motor vehicles servers for the state and at least one other state;
    cause the processor to receive telematics data from the vehicle relevant for determining whether the vehicle satisfies certain inspection criteria; and
    cause updating of records in the department of motor vehicles server associated with the state to update the vehicle inspection certificate based on satisfaction of the certain inspection criteria.

13. The computer system as recited in claim 12, wherein the instructions are configured to further cause the processor to establish data communication between the fuel dispensing apparatus and a mobile computing device associated with the vehicle located in proximity to the fuel dispensing apparatus.

14. The computer system as recited in claim 13, wherein the expired status of the vehicle inspection certificate is provided on a display integrated with the mobile computing device.

15. The computer system as recited in claim 12, wherein the fuel dispensing apparatus is in communication with memory containing vehicle inspection information for a plurality of vehicles.

16. The computer system as recited in claim 12, wherein the instructions are configured to further cause the processor to generate a vehicle inspection certificate from a printer device associated with the fuel dispensing apparatus.

17. The computer system as recited in claim 12, wherein the instructions are configured to further cause the processor to send proof of a vehicle inspection certificate to a mobile computing device associated with the vehicle located in proximity to the fuel dispensing apparatus.

18. The computer system as recited in claim 12, further comprising:
- an optical scanning device configured to collect optical information related to a vehicle; and
- an optical recognition module configured to determine and recognize a visual characteristic of the vehicle based on the optical information, wherein the certain inspection criteria is assessed based on the visual characteristic.

* * * * *